US007333831B2

(12) United States Patent
Srinivasan et al.

(10) Patent No.: US 7,333,831 B2
(45) Date of Patent: Feb. 19, 2008

(54) INTERCHANGEABLE RECEIVE INPUTS FOR BAND AND SYSTEM SWAPPABILITY IN COMMUNICATION SYSTEMS AND RELATED METHODS

(75) Inventors: Vishnu S. Srinivasan, Austin, TX (US); Gary B. Levy, Austin, TX (US); Brett O. Mitchelson, Austin, TX (US); Donald A. Kerth, Austin, TX (US); Eric R. Garlepp, Austin, TX (US); G. Tyson Tuttle, Austin, TX (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 11/231,182

(22) Filed: Sep. 20, 2005

(65) Prior Publication Data

US 2006/0178122 A1    Aug. 10, 2006

Related U.S. Application Data

(60) Provisional application No. 60/650,492, filed on Feb. 7, 2005.

(51) Int. Cl.
*H04B 1/18* (2006.01)

(52) U.S. Cl. ............... 455/552.1; 455/132; 455/232.1; 330/295

(58) Field of Classification Search ............ 455/552.1, 455/553.1, 132; 330/295
See application file for complete search history.

(56) References Cited

U.S. PATENT DOCUMENTS

| | | | | |
|---|---|---|---|---|
| 5,640,697 | A * | 6/1997 | Orndorff ............... | 455/315 |
| 5,694,414 | A | 12/1997 | Smith et al. ............ | 375/200 |
| 6,029,052 | A * | 2/2000 | Isberg et al. ........... | 455/131 |
| 6,125,271 | A | 9/2000 | Rowland, Jr. .......... | 455/313 |
| 6,351,236 | B1 | 2/2002 | Hasler ................. | 342/357.09 |
| 6,584,304 | B1 | 6/2003 | Thomsen et al. ....... | 455/188.1 |
| 6,694,129 | B2 * | 2/2004 | Peterzell et al. ....... | 455/76 |
| 6,798,294 | B2 * | 9/2004 | Kuiri ................... | 330/295 |
| 6,845,231 | B2 | 1/2005 | Frank .................. | 455/88 |
| 6,952,594 | B2 | 10/2005 | Hendin ................ | 455/552.1 |

(Continued)

OTHER PUBLICATIONS

PCT International Search Report, PCT/US2006/01653 filed Jan. 19, 2006.

*Primary Examiner*—Edward F. Urban
*Assistant Examiner*—Adeel Haroon
(74) *Attorney, Agent, or Firm*—Peter Zawilski

(57) ABSTRACT

Interchangeable high band low-noise-amplifiers (LNAs) and low band low-noise-amplifiers (LNAs) and related methods are disclosed that greatly enhance the efficiency of designing handsets for different combinations of frequency bands. The input signals to particular pins on a receiver or transceiver integrated circuit (IC) are swappable such that multiple frequency bands can be input to the same input pins thereby allowing for simplified system design. Efficient programmable techniques are also disclosed for controlling a swap mode within communication ICs. These interchangeable or band swappable input paths, for example, can be utilized to allow interchangeability between high band (PCS, DCS) and low band (GSM, E-GSM) inputs for cellular communications. In this way, for example, handset manufacturers can build a single printed circuit board (PCB) that can be utilized for cellular communications in the United States of America, where 850 MHz (GSM) and 1900 MHz (PCS) bands are utilized, and in Europe, wherein 900 MHz (E-GSM) and 1800 MHz (DCS) bands are utilized.

37 Claims, 5 Drawing Sheets

U.S. PATENT DOCUMENTS

| | | | |
|---|---|---|---|
| 2002/0090974 A1 | 7/2002 | Hagn | 455/552 |
| 2004/0254778 A1 | 12/2004 | Laurent et al. | 703/25 |
| 2005/0079847 A1* | 4/2005 | Arafa | 455/272 |
| 2005/0266806 A1* | 12/2005 | Soe et al. | 455/88 |

* cited by examiner

US 7,333,831 B2

INTERCHANGEABLE RECEIVE INPUTS FOR BAND AND SYSTEM SWAPPABILITY IN COMMUNICATION SYSTEMS AND RELATED METHODS

RELATED APPLICATIONS

This application claims priority to co-pending provisional application: Provisional Application Ser. No. 60/650,492 filed Feb. 7, 2005, and entitled "INTERCHANGEABLE HIGH BAND AND LOW BAND LNAS," which is hereby expressly incorporated by reference in its entirety.

TECHNICAL FIELD OF THE INVENTION

This invention relates to high frequency communications and, more particularly, to receivers operable within multiple frequency bands within one or more different communication systems, as well as the communication system products within which such receivers are implemented, including multiple band and multiple system cellular handsets and wireless data modems.

BACKGROUND

Receivers are used in a wide variety of communication systems. A communication system typically includes front-end circuitry that processes incoming signals and provides them to additional receiver circuitry. In particular, a radio frequency signal is often transmitted through an air interface and received at an antenna. The signal may then be actively or passively filtered to select a frequency band of interest. A communication system may have a single frequency band of interest, or it may have multiple frequency bands of interest that can be received. For example, with respect to cellular telephone communication systems, different frequency bands are used by cellular networks depending upon the geographic location and type of the cellular network in operation, and cellular handsets are often configured to operate in multiple bands. Band selection is accomplished in many communication systems with a filter circuit, such as a surface acoustic wave filter (SAW), but also can be accomplished by other means. It is noted that to accomplish an optimal trade-off of out-of-band attenuation, desired passband characteristics, overall performance, size, and cost, this filter circuitry is often tuned specifically to the desired band of interest. The band-selected signal may then pass through input match circuitry to maximize the signal power or signal voltage to the receiver inputs. This match circuitry can be located in any preceding stage to the receiver inputs. The signal is then provided to frequency band specific inputs of the receiver where the first receiver stage commonly includes a frequency-band-specific low noise amplifier (LNA). As with the filter circuitry, it is noted that receiver inputs are often tuned to the frequency range or band of interest to accomplish an optimal trade-off of out-of-band attenuation, desired passband characteristics, gain, noise, overall performance, size, current consumption, and cost. It is further noted that there may be frequency-band-specific local oscillator signals provided to a mixing stage after low noise amplification is completed to down-convert the received signal to a desired intermediate frequency or to baseband for subsequent demodulation and digital processing.

Many communication systems also include transmit path circuitry. As such, transceiver (receiver plus transmitter) integrated circuits are often utilized in a wide variety of communication systems. The addition of the transmitter affects the front-end circuitry by often requiring the addition of an antenna switch module (ASM) that includes transmit filtering to select between either receive or transmit operation in communication systems where the receive and transmit operation are not concurrent or otherwise active at the same time. It is noted that the ASM may be exchanged for a duplexer that can provide isolation between the receive and transmit paths while combining the transmit and receive paths at the antenna in communication systems with concurrent receive and transmit operations. Combinations of these concurrent and non-concurrent communication systems may also be made, and the front-end circuitry for such combined systems can include both an ASM and a duplexer. It is also noted that additional functions may be implemented in the front-end network, if desired.

It is also common for the different functions and blocks within the front-end system to be combined together in a modularized package for use in communication systems that are directed to commonly used sets of frequency bands. Some of the different modularized package combinations of interest that are commonly encountered in communication systems, such as cellular telephone handsets, include front-end modules (FEMs) that combine ASMs and any combination of available SAW filters, include SAW filterbanks that integrate any combination of available SAW filters, and include modules that combine SAW filterbanks with associated matching networks. It is noted, however, that these examples should not be considered as limiting, and it is recognized that other combinations, modules and arrangements can be provided, if desired. In short, a wide variety of modules can be provided that combine antenna switches (such as ASMs and duplexers), filterbanks (such as SAW filterbanks), and additional circuitry (such as input matching networks). As indicated above, these different module combinations can be implemented for use with selected frequency bands, as desired. It should also be noted that when considering FEMs, filterbanks, and receivers/transceivers for different communication systems and the number of vendors that provide these products, while there may be several frequency bands available to implement, it is rare to find a communication standard that specifies the ordering of the frequency bands as they are defined and placed in the package.

In some communications environments, different communication systems utilize different frequency bands for device communications. For example, with respect to GSM/GPRS/EDGE cellular telephone communication systems, different frequency bands are used depending upon the geographic location and type of the cell network in operation. In the United States of America, the frequency bands utilized are currently the 850 MHz (GSM) and 1900 MHz (PCS) bands. In Europe and Asia, the frequency bands utilized are currently the 900 MHz (E-GSM) and 1800 MHz (DCS) bands. A quad-band handset typically refers to a cell phone that operates in all four of these frequency bands. A triple-band handset typically refers to one that operates in three of these frequency bands. And a dual-band handset typically refers to one that operates in two of these frequency bands.

While quad-band cell phones are available, the bulk of the cellular phone handset market currently ships as dual-band or triple-band handsets. The band combinations selected for these dual and triple band handsets are often different among the various handset manufacturers depending upon the markets being targeted by those manufacturers. Considering that there are two low bands (GSM, E-GSM), two high bands (DCS, PCS), and at least one of each is typically chosen for a handset, there are eight available dual and triple band combinations that could be selected by the handset manufacturers (GSMIDCS, GSM/PCS, E-GSMIDCS, E-GSM/PCS, GSMIDCS/PCS, E-GSM!DCSIPCS, GSM/E-GSMIDCS, and GSMIE-GSMIPCS). As such, for flexibility, a handset manufacturer will typically require quad-band support from the transceiver integrated circuit (IC) it uses for its handsets. Using this transceiver IC, a manufacturer will then make a variety of handsets with different dual-band or triple-band combinations depending upon frequency bands it selects for markets it targets to minimize cost overhead. This approach, therefore, requires financial and labor resource allocation with respect to each different handset design for schematic generation, printed circuit board generation, certification, and inventory management.

In short, it is often desirable for communication systems to operate in multiple frequency bands. It is also often desirable for communication system manufacturers to make one communication system for a first set of frequency bands, a second communication system for a second set frequency bands, and so on. With prior solutions, however, each new set of frequency bands requires specific front-end circuitry, specific PCB routing, and/or different variations of receiver/transceiver integrated circuits in order to allow the different communication systems to work.

SUMMARY OF THE INVENTION

The present invention provides in part interchangeable receive inputs including interchangeable high band low-noise-amplifiers (LNAs) and low band low-noise-amplifiers (LNAs) and related methods that greatly enhance the efficiency of designing handsets for different combinations of frequency bands. As such, the input signals to particular pins on a receiver or transceiver integrated circuit (IC) are swappable such that multiple frequency bands from one or more communication systems can be input to the same input pins thereby allowing for simplified system design. In addition, efficient programmable techniques are disclosed for controlling a swap method whereby the interchangeable inputs are configured within communication ICs.

These interchangeable or band swappable LNAs, for example, can be utilized to allow interchangeability between high band (PCS, DCS) and low band (GSM, E-GSM) inputs for GSM/GPRS/EDGE cellular communications. An advantage of the present invention, for example, is to allow handset manufacturers to build one dual or triple band platform and then choose GSM/DCS, E-GSM/PCS, GSM/PCS, E-GSM/DCS, GSM/DCS/PCS, E-GSM/DCS/PCS, GSM/E-GSM/DCS, GSM/E-GSM/PCS, or any of the other desired combination of operational bands selected through software configurations or some other configuration technique. In this way, for example, handset manufacturers can build a single printed circuit board (PCB) that can be utilized for cellular communications in the United States of America, where 850 MHz (GSM) and 1900 MHz (PCS) bands are utilized, or in Europe and Asia, wherein 900 MHz (E-GSM) and 1800 MHz (DCS) bands are utilized. In addition, hybrid configurations can be created using 850 MHz (GSM) and 1800 MHz (DCS) bands or 900 MHz (E-GSM) and 1900 MHz (PCS) bands for region roaming users.

Additionally, when manufacturers consider different front-end modularized packages, the present invention of interchangeable or band swappable receive inputs provides further advantages. For example, the present invention prevents the manufacturer from being forced to make an additional PCB, to cross the PCB traces to account for different pin order, to require a transceiver IC variant from the transceiver supplier with the band specific input stages rotated, or to be unable to consider multiple sourced front-end components which could inhibit competition and/or supply.

In short, systems and methods of the present invention, as described in more detail below, enable lower product cost, faster time to market, reduced inventory management, and the capability for multi-sourced integrated front-end components.

In one embodiment, the present invention is a communication system having band swappable receive inputs including receive path circuitry within an integrated circuit and external circuitry coupled to input pins for the integrated circuit. The integrated circuit includes one or more low noise amplifiers (LNAs) each being configured to operate in multiple frequency bands, control circuitry coupled to provide one or more control signals to select frequency bands of operation for the LNAs, and one or more input pins associated with each LNA. And the external circuitry is configured for a desired set of frequency bands of operation for the communication system. More particularly, the communication system further includes a printed circuitry board (PCB) upon which the integrated circuit and the external circuitry are coupled where the PCB has connections from the external circuitry to the integrated circuit. In addition, the receive path circuitry can include four LNAs with each LNA configured to be swappable between at least two frequency bands. Still further, two LNAs can be swappable between the 850 MHz (GSM) and the 900 MHz (E-GSM) bands, and two LNAs can be swappable between the 1800 MHz (DCS) and 1900 MHz (PCS) bands.

In another embodiment, the present invention is an integrated circuit having band swappable receive inputs including one or more low noise amplifiers (LNAs) each being configured to operate in multiple frequency bands, control circuitry coupled to provide one or more control signals to select frequency bands of operation for the LNAs, and one or more input pins associated with each LNA. In addition, the control circuitry can include a software programmable configuration register including one or more bits configured to allow selection of frequency bands of operation for the LNAs. Still further, the programmable register can include a single swap bit that selects a first set of frequency bands in a default setting and a second set of frequency bands in a non-default setting. More particularly, the frequency bands can be cellular telephone frequency bands, and wherein the receive path circuitry can include a first LNA having a default mode of operation in a 850 MHz (GSM) band and a non-default mode of operation in a 900 MHz (E-GSM) band, a second LNA having a default mode of operation in the 900 MHz (E-GSM) band and a non-default mode of operation in the 850 MHz (GSM) band, a third LNA having a default mode of operation in a 1800 MHz (DCS) band and a non-default mode of operation in a 1900 MHz (PCS) band, and a fourth LNA having a default mode of operation in the 1900 MHz (PCS) band and a non-default mode of operation in the 1800 MHz (DCS) band.

In a further embodiment, the present invention is a method for receiving communications with swappable receive inputs including providing an integrated circuit with receive path circuitry having one or more low noise amplifiers (LNAs) configured to operate in multiple frequency bands with each LNA being associated with one or more input pins for the integrated circuit, selecting the frequency bands of operation for the LNAs, and receiving one or more input signals within the selected frequency bands at input pins to the integrated circuit. In addition, the frequency bands can include cellular telephone frequency bands and/or frequency bands from other types of communication systems. The method can further include configuring external circuitry for operation in one or more of the frequency bands and coupling the external circuitry to the input pins for one of more of the LNAs. In addition, the selecting step can include programming one or more bits of a configuration register within the integrated circuit to select frequency bands of operation for the LNAs. And this configuration register can be set by commands from a baseband processor. Still further, the selecting step can include selecting a first set of frequency bands in a default setting and a second set of frequency bands in a non-default setting. More particularly, the frequency bands can be cellular telephone frequency bands, and the default setting selects a 850 MHz (GSM) band for a first LNA, selects a 900 MHz (E-GSM) band for a second LNA, a 1800 MHz (DCS) band for a third LNA, and a 1900 MHz (PCS) band for a fourth LNA; and selecting the non-default settings selects the 900 MHz (E-GSM) band for the first LNA, selects the 850 MHz (GSM) band for the second LNA, selects the 1900 MHz (PCS) band for the third LNA, and selects the 1800 MHz (DCS) band for the fourth LNA.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 1:
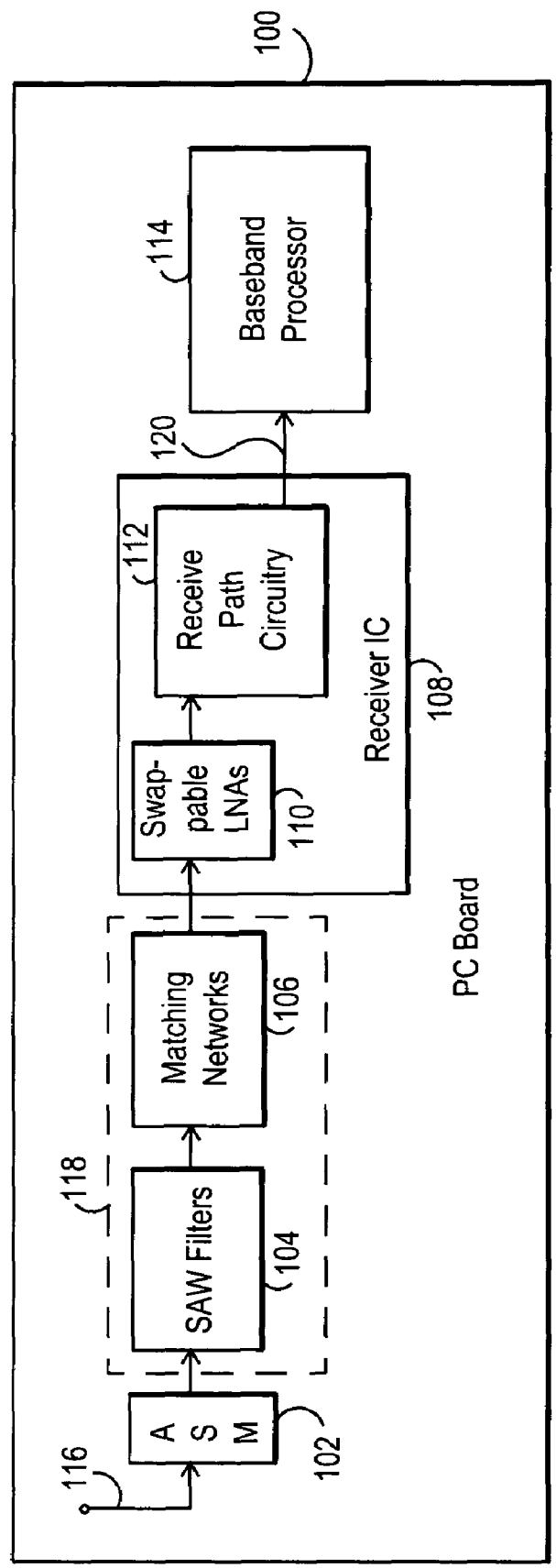
FIG. 1 is a block diagram of a printed circuit board (PCB) design for a system including band swappable receive inputs and low noise amplifiers (LNAs) according to the present invention.

The present invention provides in part interchangeable high band and low band low-noise-amplifiers (LNAs) for band swappability in communication systems and related methods. According to the present invention, swappable receive inputs and LNA circuitry are utilized for operation of a communication device within communication systems that use different sets of frequency bands. Specifically, where there are multiple frequency bands that require independent receive paths for frequency band and/or channel selection, the present invention provides the capability that a given receive path is not only capable of receiving a default or primary frequency band or channel but also is capable of receiving other non-default or secondary frequency bands or channels. This swapping or interchanging of frequency bands of operation can be controlled, for example, through a hardware or software configuration feature for the communication device.

As discussed above, for many communication products, there can be a wide range of operational configurations that can be selected by a manufacturer. For example, there may be a wide number of communication system modes to choose from, a wide range of possible frequency bands both within a given communication system and across communication systems to choose from, and an array of front-end options (for antenna switching, duplexing, frequency band selection, and input matching, etc.) that may be chosen for interfacing to the receiver or transceiver integrated circuit within the communication system. Any particular communication product will also tend to be a member of a communication product portfolio because each communication product will often be aligned to a particular market tier or targeted at certain markets and/or regions. In addition, for financial, design, and resource efficiency reasons, a manufacturer may implement different subsets of the allowed permutations of operational configurations created by the different communication systems, available frequency bands, and front-end system functions/blocks. In short, this wide range of possibilities for operational configurations creates the requirement that a manufacturer must traditionally undergo a unique design process and create a unique printed circuit board (PCB), including corresponding unique hardware and software, for each of the different permutation the manufacturer intends to implement as a product.

Of particular interest is the case where a communication system has several frequency bands available for operation but where some of the bands may be specific to a region or function. In this case, manufacturing a product with the full array of options, when it is targeted for a specific region or product tier, may not be feasible because the product will carry the overhead of extra costs from items needed for the additional options. These items can include extra antenna switching circuitry (or duplexing capability), additional frequency band selection circuitry, and additional input match components, as well as additional inventory management and procurement expenses. Thus, if these extra features and circuitry allow for operational capabilities that will not be used, then they are simply adding unnecessary and undesirable cost to the communication product.

For example, with respect to the GSM/GPRS/EDGE cellular telephone communication system family, different frequency bands are used depending upon the geographic location and type of the cell network in operation. In North America, the GSM frequency bands utilized are currently the 850 MHz (GSM) and 1900 MHz (PCS) bands. In Europe and Asia, the frequency bands utilized are currently the 900 MHz (E-GSM) and 1800 MHz (DCS) bands. Other continents and countries have various combinations of these bands. A quad-band handset typically refers to a cell phone that operates in all four of these frequency bands. A triple-band handset typically refers to one that operates in three of these frequency bands. And a dual-band handset typically refers to one that operates in two of these frequency bands. As discussed above, while quad-band cell phones are available, dual-band and triple-band handsets dominate worldwide handset shipments. The band combinations selected for these dual and triple band handsets are different among the various handset manufacturers depending upon the targeted market segment and handset shipment and or usage region.

While it might seem possible to just design one printed circuit board (PCB) with all of the available frequency band inputs and then to create communication products for specific regions or market tiers by only populating those PCB traces and land-patterns with the respective components as defined by region or tier, this approach is, in practice, not feasible. One reason for this non-feasibility is that unused receiver inputs typically should not have unnecessary exposed (or non-terminated) inputs as this can corrupt receiver performance. In addition, reserving room for unused inputs wastes PCB real estate which is both a financial expense and an opportunity cost against using the space in another manner. In high frequency product designs, making both the PCB layout small and minimizing extra routes and traces minimizes parasitic interference and signal coupling that can degrade performance. Additionally, the front-end components are usually configured by the number of available bands they support and are often not PCB footprint compatible, and hence the manufacturer would still carry a cost and resource overhead.

When a communication system product manufacturer considers using modularized front-end components, as discussed above, additional complications arise with respect to PCB design. The vendors that provide modularized packages for FEMs, filterbanks, and receivers/transceivers for different communication systems rarely implement these packages using the identical bands and/or the identical band ordering within the package. Thus, while there may be several frequency bands available to implement, it is rare to find a communication standard that specifies the ordering of the frequency bands as they are defined and placed in the modularized package. An example of this complication and how the present invention provides a unique and advantageous solution to this problem are discussed in more detail with respect to FIGS. 5A and 5B below.

As indicated above, the present invention provides interchangeable receive inputs, swappable low-noise-amplifiers (LNAs), and related methods that greatly enhance the efficiency of designing handsets for different combinations of frequency bands and communication systems. As such, the input signals to particular pins on a receiver or transceiver integrated circuit (IC) are swappable such that multiple frequency bands can be input to the same input pins thereby allowing for simplified system design. The invention of interchangeable receive inputs can be applied to any communication system with multiple frequency bands and combinations of communication systems including but not limited to GSM/GPRS/EDGE systems, WCDMA systems, GPS systems, CDMA systems, WLAN systems, Bluetooth systems, FM/AM radios, satellite radios, or any other desired communication system. It is also noted that frequency bands that can be combined with respect to the present invention include different bands within one type of communication system, such as the different frequency bands used for cellular communications, and include bands from different types of communication systems such as cellular communications and GPS, Bluetooth or radio communications.

To implement multiple different frequency band sets for prior communication products, multiple PCBs would typically be designed. As discussed above, the present invention allows for the same PCB design to be utilized in part by providing interchangeable receive path inputs pins for an integrated receiver or transceiver. In part, the integrated receiver or transceiver allows the expected or native frequency band inputs to be swapped to a non-native frequency band input without suffering performance degradation that would cause the performance of the communication product to be unacceptable. The interchangeable receive inputs, therefore, allow for receipt of multiple frequency bands without degradation beyond the customer and manufacturer expectations and requirements and without degradation that would be in violation of the communication system standard requirements. In addition, as discussed below, the present invention provides a simplified and efficient configuration and control techniques for determining when the integrated receiver or transceiver is to be placed in an input swap mode. In particular, one or more programmable bits within an on-chip configuration register may be utilized for frequency band selection.

The interchangeable inputs and band swappable LNAs discussed below, for example, can be utilized to allow interchangeability between high band (PCS, DCS) and low band (GSM, E-GSM) inputs for GSM/GPRS/EDGE cellular communications. One advantage of the present invention, for example, is to allow handset manufacturers to build one dual or triple band platform and then choose GSM/DCS, E-GSM/PCS, GSM/PCS, E-GSM/DCS, GSM/DCS/PCS, E-GSM/DCS/PCS, GSM/E-GSM/DCS, GSM/E-GSM/PCS or any of the other desired combination of operational bands through software configurations or some other configuration technique. In this way, for example, handset manufacturers can build a single printed circuit board (PCB) that can be utilized for cellular communications in the United States of America, where 850 MHz (GSM) and 1900 MHz (PCS) bands are utilized, and in Europe or Asia, wherein 900 MHz (E-GSM) and 1800 MHz (DCS) bands are utilized, or create hybrid configurations of either 850 MHz (GSM) and 1800 MHz (DCS) or 900 MHz (E-GSM) and 1900 MHz (PCS) for region roaming users.

Other advantages available to the communication product manufacturer from the invention are lower product cost, faster time to market, reduced inventory management, and capability for multi-sourced integrated front-end components. These advantages are available because the manufacturer can target products with the exact frequency bands needed and not ship a triple-band product into a dual-band market because design time or other resources were not available. The manufacturer can also quickly respond to frequency band related market trends since the initial PCB design can be made applicable to other frequency band configurations without PCB change by only changing the external components on the PCB related to the frequency band selection and input match (or integrated front-end component) to reflect the new operational bands. Inventory management is improved for the manufacturer because the receive inputs and LNAs are interchangeable according to the present invention, and therefore the PCB connections to the pins of receiver are not required to be changed, as would be the case with prior solutions. In this manner, only one PCB is needed thereby eliminating the need to stock PCBs for other frequency band configurations. Inventory management for the transceiver IC vendor is also simplified because only one transceiver IC is required as opposed to fabricating transceiver die variations that have different orderings of the LNA inputs. The manufacturer also benefits from the ability to multi-source integrated front-end components to ensure adequate supply and competition because the transceiver IC inputs are independent of the integrated FEM or filterbank frequency band configuration, and the PCB traces do not need to be rerouted at the integrated FEM or filterbank to receiver interface.

Additionally, the invention includes software or hardware control to configure the receive path circuitry depending upon the frequency band selected. Typically, in operation of a communication device including an integrated circuit with swappable receive path inputs according to the present invention, the communication system base station will determine the band of operation for the device. The device will then adjust its operation for this frequency band. For example, local oscillator (LO) mixing signals may be adjusted for signal down-conversion to a desired IF frequency. In addition, processing provided by the digital signal processor (DSP) may be modified depending upon the communication protocols used for the selected frequency band.

With respect to the input signal paths and on-chip LNA circuitry, this swapping or interchanging of frequency bands of operation can be controlled, for example, through a software or hardware configuration feature for the communication device. The swapping control is preferably a software programmable control so as to prevent any need to change the printed circuit board (PCB) for the communication device. When implemented in software, for example, the swapping control can be implemented with a limited number of bits at the register control level of the receiver/transceiver IC to minimize the software impact upon the communication product. As an example, if a single receive input is to be capable of receiving two different frequency band inputs (as opposed to requiring two unique transceiver frequency band paths), a single bit can be used to decode the appropriate configuration needed to process a default frequency input or a non-default frequency input. As another example, to receive one default and two to three non-default frequency bands on the same input, a two bit code could be used to resolve the three or four unique receive chain configurations. It is noted that other on-chip register configurations could also be utilized, if desired, and the on-chip configuration registers can be set through commands sent to a communication interface for the integrated circuit.

Figure 2:
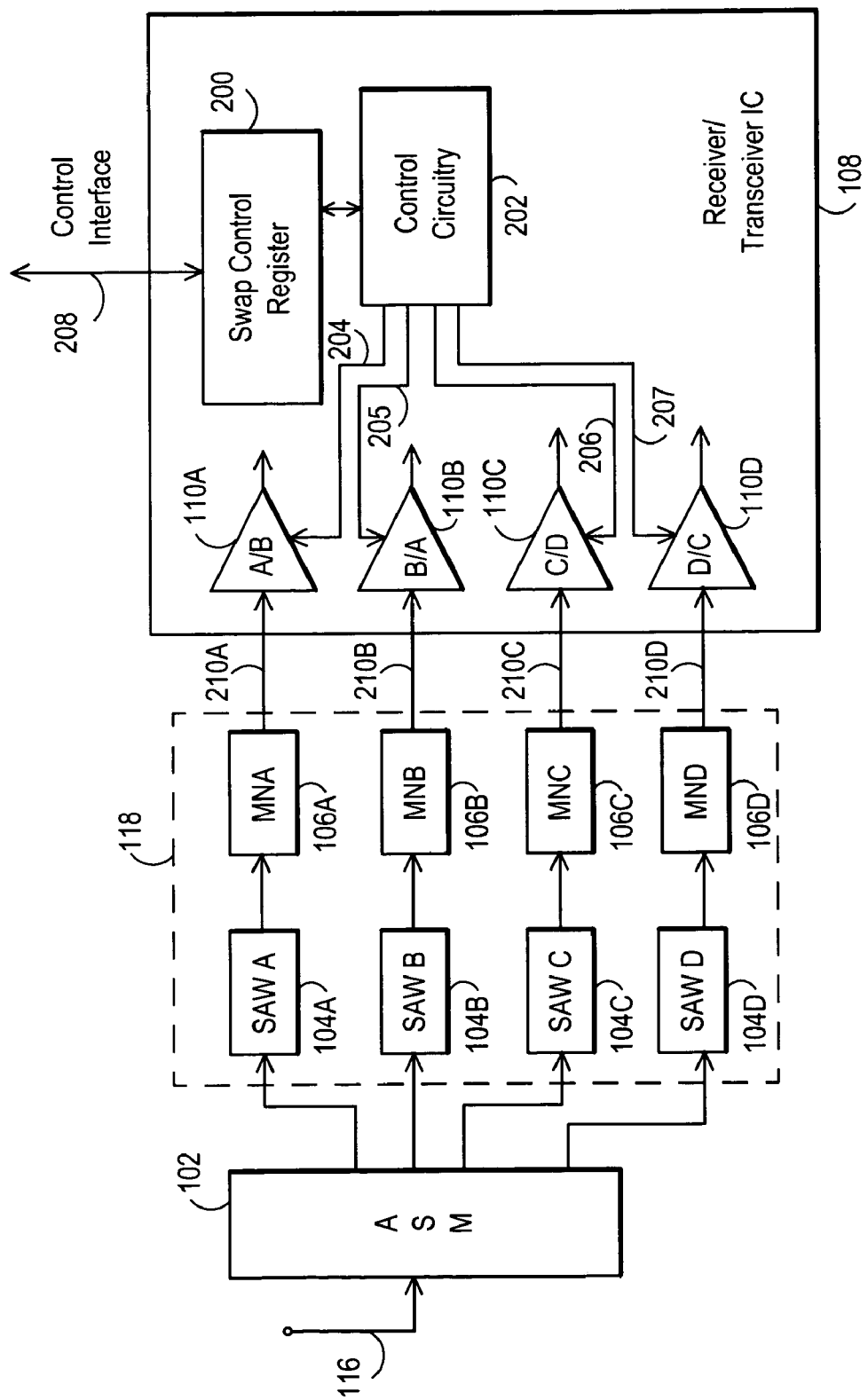
FIG. 2 is a block diagram for an embodiment of the front-end circuitry including swap control circuitry for the band swappable receive inputs and low noise amplifiers (LNAs) according to the present invention.
Figure 3A:
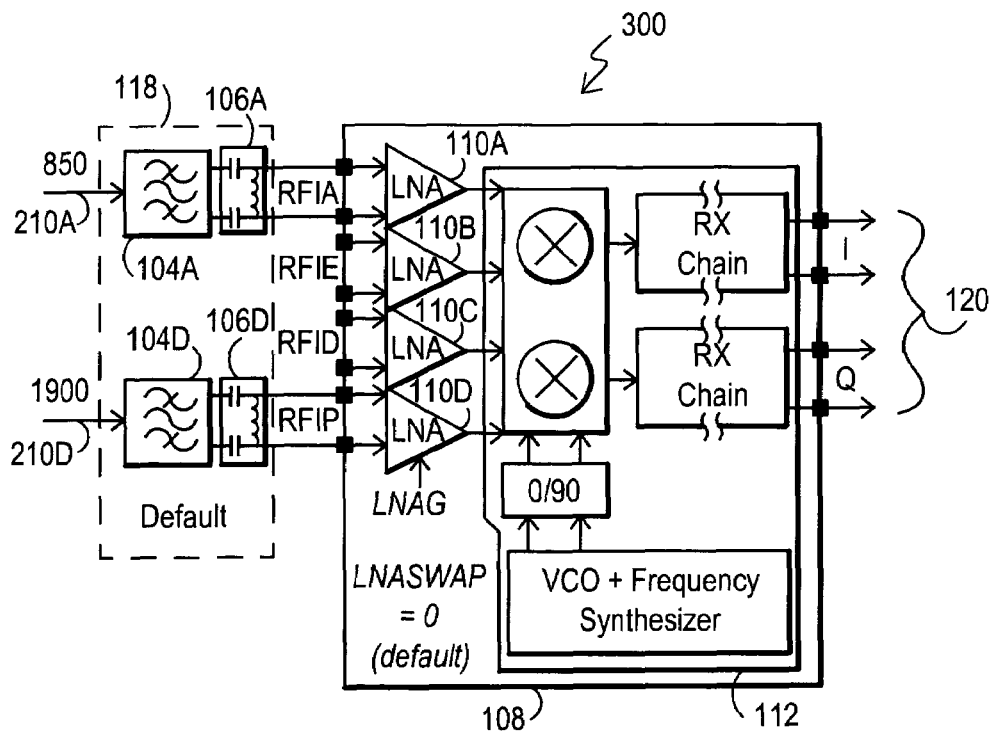
FIG. 3A is a block diagram for an embodiment of the present invention for dual-band implementation directed to 850 MHz and 1900 MHz bands where a swap control register is set to its default setting.
Figure 3B:
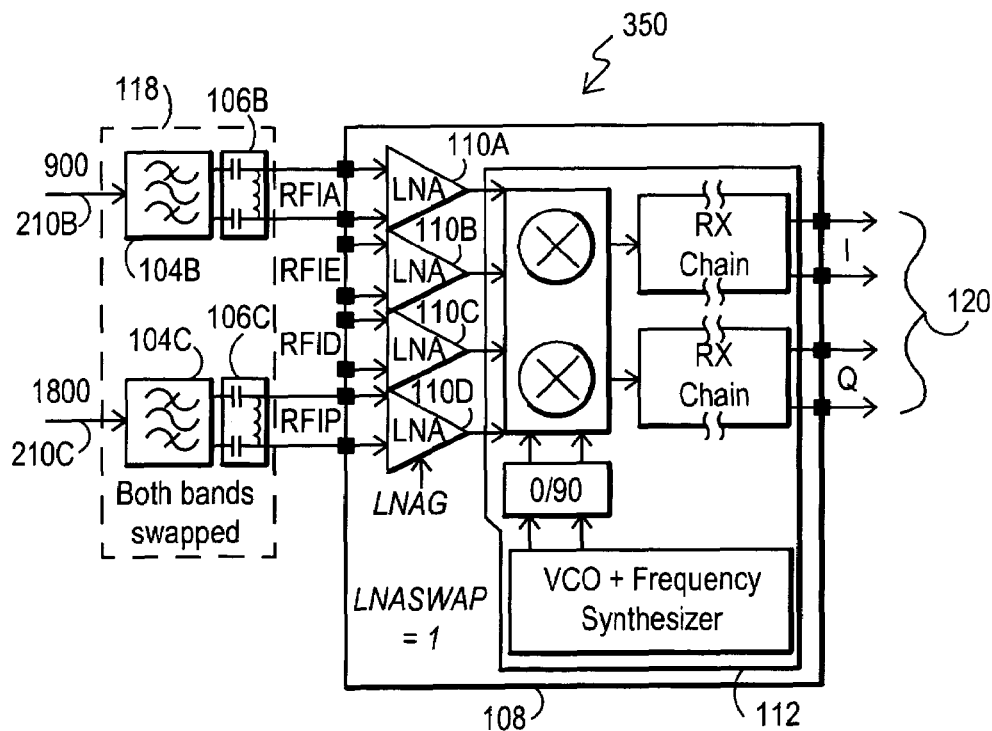
FIG. 3B is a block diagram for the embodiment of FIG. 3A where the swap register is set to a non-default setting such that the dual-band implementation is now directed to 900 MHz and 1800 MHz bands.
Figure 4:
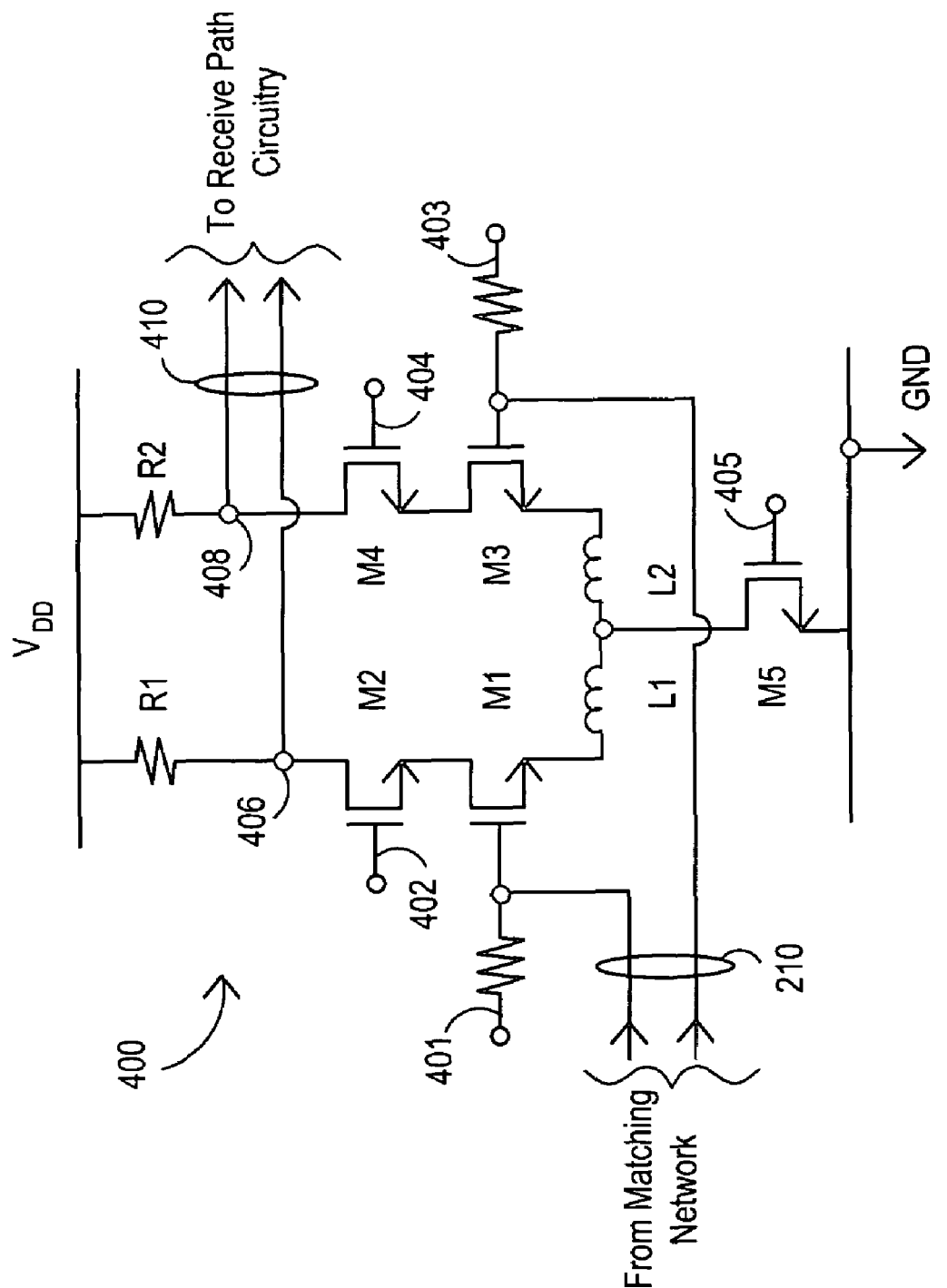
FIG. 4 is a circuit diagram of an embodiment for low noise amplifier (LNA) circuitry integrated within a receiver/transceiver integrated circuit IC.
Figure 5A:
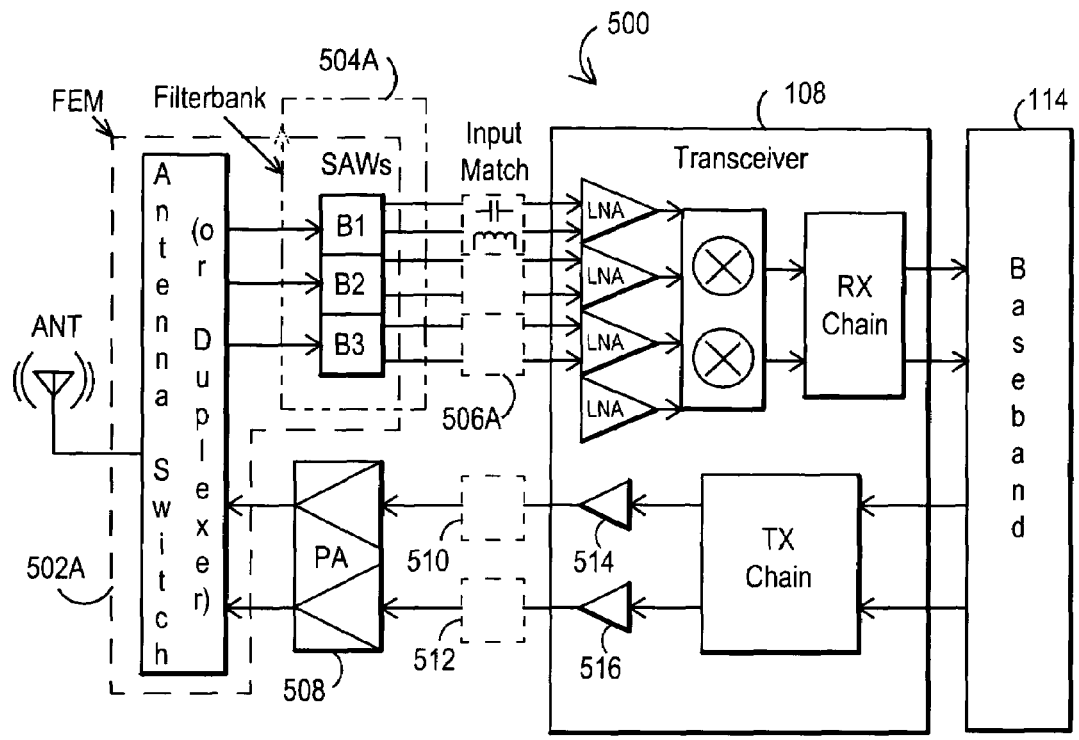
FIGS. 5A and 5B provide example embodiments for use of the present invention with PCBs and modularized packages.
Figure 5B:
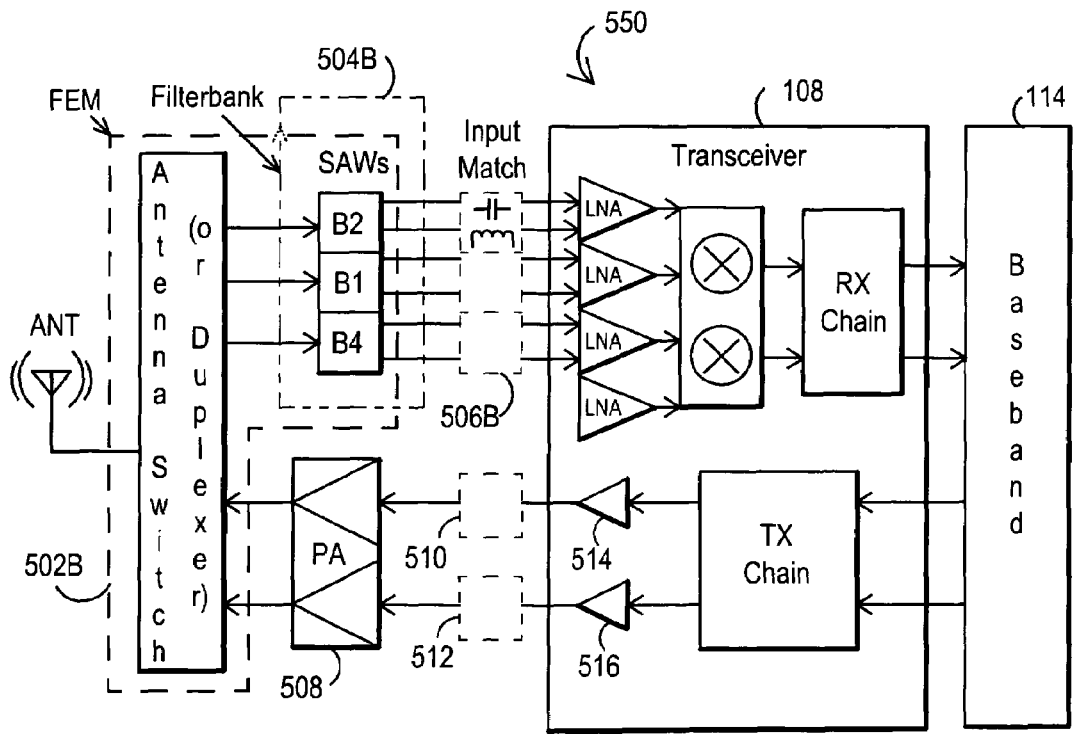

Example embodiments for the present invention will now be described with respect to the drawings. FIGS. 1 and 2 are block diagrams representing a printed circuitry board (PCB) design having connections to a receiver or transceiver utilizing filters and matching networks. FIGS. 3A and 3B provide an embodiment for a dual-band cellular phone implementing band swappable front-end circuitry. FIG. 4 is an embodiment for LNA circuitry that could be utilized according to the present invention. And FIGS. 5A and 5B provide example embodiments for use of the present invention with PCBs and modularized packages. It is noted that although receive paths are shown and discussed below, many communication devices have both a receive path and a transmit path. Cellular telephone handsets, for example, often have transceiver integrated circuits (ICs) that include both receive path and transmit path circuitry. Thus, a receiver IC as used herein could also be a transceiver IC.

FIG. 1 is a block diagram for a printed circuit board (PCB) 100 including band swappable low noise amplifiers (LNAs) 110 according to the present invention. In the embodiment depicted, this PCB 100 includes an antenna connection 116 connected to an antenna switch module (ASM) 102. The ASM 102 is connected to filter and matching circuitry 118 that includes, for example, SAW (surface acoustic wave) filters 104 and matching networks 106. The filter and matching circuitry 118 is connected to the receiver or transceiver integrated circuit (IC) 108. The receiver IC 108 includes swappable front-end circuitry, such as swappable LNAs 110, connected to additional receive path circuitry 112. The receiver IC 108 then outputs complex digital received signals 120 to a baseband processor 114.

FIG. 2 is a block diagram for an embodiment of band swappable front-end circuitry including swap control circuitry according to the present invention. As depicted, the ASM 102 receives an incoming signal from the antenna connection 116. In a quad-band solution, the output of the ASM 102 is split into four paths within the filter and matching circuitry 118 with one path being for each band. In particular, the first path is designed for a first band of operation (A-band), includes SAW filter A (SAW A) 104A and matching network A (MNA) 106A, and outputs signal 210A to a first LNA 110A. The second path is designed for a second band of operation (B-band), includes SAW filter B (SAW B) 104B and matching network B (MNB) 106B, and outputs signal 210B to a second LNA 110B. The third path is designed for a third band of operation (C-band), includes SAW filter C (SAW C) 104C and matching network C (MNC) 106C, and outputs signal 210C to a third LNA 110C. And the fourth path is designed for a fourth band of operation (D-band), includes SAW filter D (SAW D) 104D and matching network D (MND) 106D, and outputs signal 210D to a fourth LNA 110D.

As depicted, LNA 110A and LNA 110B are interchangeable between the A-band and the B-band. For LNA 110A, the primary band of operation is the A-band, and the secondary band of operation is the B-band. For LNA 110B, the primary band of operation is the B-band, and the secondary band of operation is the A-band. Similarly, LNA 110C and LNA 110D are interchangeable between the C-band and the D-band for the communication system. For LNA 110C, the primary band of operation is the C-band, and the secondary band, of operation is the D-band. For LNA 110D, the primary band of operation is the D-band, and the secondary band of operation is the C-band. It is noted that the LNAs could be configured for operation in more then two bands, if desired. The signals 210A, 210B, 210C and 210D are provided to receive path inputs for the integrated receiver 108, and these signals are then coupled to the LNAs 110A, 110B, 110C and 110D. As described herein, if the operational bands for these receiver inputs and associated LNAs are swapped, the signals paths to the receiver IC 108 still remain the same. External to the receiver IC 108, it is simply the filter and matching circuitry 118 that will change to account for the band change. Internally, as described above, swap control signals cause changes to the receive path circuitry within the receiver IC 108 to account for the band swap.

It is noted that the LNA circuitry, as described in the preceding paragraph, refers to the on-chip LNA circuits within the integrated circuit (e.g., a receiver or transceiver IC). From a signal-processing standpoint, the complete LNA circuit from a performance standpoint may be considered also to include the matching network (MN) components on the PCB and the on-chip LNA circuitry. The matching network (MN), with its band-specific inductor (L) and capacitor (C) elements, together with the on-chip LNA circuit elements can be tuned to the desired band of operation for a particular frequency band. It is also possible to change values of only the matching network (MN) elements to tune to a different band for the complete LNA but the performance may not be as optimal as when both matching network (MN) and on chip LNA circuit elements are both tuned. However, keeping the on-chip LNA circuitry fixed has the advantage of reducing the complexity and expense of the receiver/transceiver integrated circuit. Depending upon the implementation and performance desired, therefore, the matching network (MN), the on-chip LNA circuit elements, or both may be adjusted for the selected frequency band.

Control circuitry 202 controls the band of operation for the LNAs through selection signals 204 and 205 for LNA 110A and LNA 110B, respectively, and through selection signals 206 and 207 for LNA 110C and LNA 110D, respectively. As described herein, these control signals can adjust operational parameters to account for the frequency band and the signal path being selected. It is also noted that the receive path circuitry after the LNAs (e.g., mixer, analog to digital conversion (ADC) circuitry, digital signal processing (DSP) circuitry for each of the I and Q signal paths) can be utilized for all of the selectable frequency bands for all of the LNAs. Alternatively, it is noted that where there are two LNAs for high frequency bands and two LNAs for low frequency bands, the two high frequency LNAs can share high frequency mixer circuitry (e.g., I and Q path mixers), and the two low frequency LNAs can share low frequency mixer circuitry (e.g., I and Q path mixers). In this alternative embodiment, ADC circuitry and DSP circuitry (I signal path and Q signal path) could still be shared by all of the LNA paths. In addition, multiplexer circuitry, switching network circuitry or other types of multiplexing functionality can be provided at the outputs of the LNAs such that the outputs of only selected LNAs are being processed by the receive path circuitry at any given time. As described in more detail below with respect to FIG. 4, passive multiplexing of the output signals for the on-chip LNA circuits could be utilized, if desired.

The control circuitry 202 can rely upon settings in a configuration register, such as swap control register 200, to determine in which band each LNA will operate. This swap control register 200 can be configured through a control interface 208, which can be a software control interface. This swap control register, therefore, can be set based upon register commands sent to the integrated circuit 108, for example, such register commands received from a baseband processor 114 that sets the swap control register to desired settings during operation. Depending upon the number of different band options desired, for example, one or more bits in an on-chip, software controlled configuration register can be used to provide the bits for the swap control register 200. Rather than rely upon a software programmable configuration register, it is further noted that the control circuitry 202 could be configured to rely upon other types of programmable circuits, such as hardware switches, fuse circuits, anti-fuse circuits, one-time programmable FLASH memory, other types of one-time-programmable circuitry, or any other type of circuitry that can provide for selectivity. It is further noted that combinations of selection techniques could also be used, such as a combination of hardware and software controls. By allowing programming of the selected frequency bands of operation, the present invention provides for increased flexibility.

For example, looking to LNA 110A, it has been designed to operate if the A-band or the B-band is received at its inputs. In default mode, A-band signals are being input to LNA 110A. These A-band signals are then appropriately processed by the receive path circuitry based upon the communication protocols for that band. For example, in a low-IF receiver architecture, LO circuitry provides mixing signals so that a desired channel within the A-band will be down-converted to IF, then digitized, and processed with appropriate demodulation and channel selection digital signal processing. If non-default mode is set, B-band signals are being input to LNA 110A. These B-band signals are then appropriately processed by the receive path circuitry based upon the communication protocols for that band. Again, in a low-IF receiver architecture, based upon these control signals, LO circuitry provides a mixing signal so that a desired channel within the B-band will be down-converted to IF, then digitized, and processed with appropriate demodulation and channel selection digital signal processing. It is noted that the receive path processing, such as demodulation processing, will be dependent upon the protocols and modulation techniques used for the frequency band being processed at any given time.

One example application for the present invention is in cellular telephone communications. For example, with respect to GSM/GPRS/EDGE cellular communication systems, which use four frequency bands—850 MHz (GSM), 900 MHz (E-GSM), 1800 MHz (DCS) and 1900 MHz (PCS)—a receiver or transceiver can be designed with swappable front-end circuitry, such as low noise amplifiers (LNAs) that can be swapped or interchanged between multiple operational bands. This front-end circuitry can be configured to operate in a default mode to receive default frequency bands and to operate in one or more non-default modes to receive non-default frequency bands. This frequency band selection can be controlled, for example, through the use of a swap control register, as discussed above.

In a dual-band handset solution where two-band combinations are desired, such as GSM/PCS for handsets destined for U.S. markets and E-GSM/DCS for handsets destined for European or Asian markets, a single bit in a configuration register could be used to select the set of operational bands for the LNAs. As discussed above, this configuration register can be modified and set through software control. This band swapping capability of the present invention provides advantageous features for supporting handset designs that will be utilized in different geographic regions without requiring redesign of the PCB connections for each different handset.

FIGS. 3A and 3B depict an embodiment that provides such a dual-band cellular telephone solution. As depicted therein, the frequency band signals received at the LNA inputs may be swapped. The low-band inputs for LNAs 110A and 110B (designated RFIA and RFIE) are interchangeable and may be used to receive either the GSM 850 band or the E-GSM 900 band. The high band inputs for LNAs 110C and 110D (designated RFID and RFIP) are also interchangeable and may be used to receive either the DCS 1800 band or the PCS 1900 band. In the embodiment depicted, a user-programmable bit (LNASWAP) in a configuration register is utilized to determine the mode of operation for the LNAs. Depending upon the setting of this bit to a "0" or a "1," the LNAs either operate in their default modes or in their non-default modes, respectively. As discussed above, the flexibility of this approach enables radio designers to use one PCB layout for a phone design with only a bill of materials (changing to SAW filters and matching networks designed for the selected bands) and software change to address different geographic regions. As described above, it is again noted that the complete LNA function includes the off-chip matching network elements on the PCB as well as the on-chip LNA circuitry. As such, when the LNASWAP bit is to be enabled for a given input path, the matching network elements are also swapped or tuned for the secondary band (i.e., the non-default band) for that input path.

For normal operations, therefore, the LNA swap bit in the configuration register can be set to zero, which configures the LNAs for operation in their default mode. In this default mode, the native pin inputs and LNAs are used for the corresponding default frequency bands. As depicted, therefore, in default mode, the RFIA inputs and GSM 850 LNA 110A are used for GSM 850 band operations. The RFIE inputs and E-GSM 900 LNA 110B are used for E-GSM 900 band operations. The RFID inputs and DCS 1800 LNA 110C are used for DCS 1800 band operations. And the RFIP inputs and PCS 1900 LNA 110D are used for PCS 1900 band operations. In LNA swapping mode, the non-native pin inputs and LNA are used for the frequency band. As an example, the RFIA inputs and GSM 850 LNA 110A are used for E-GSM 900 band operations. The RFIE inputs and E-GSM 900 LNA 110B are used for GSM 850 band operations. The RFID inputs and DCS 1800 LNA 110C are used for PCS 1900 band operations. And the RFIP inputs and PCS 1900 LNA 110D are used for DCS 1800 band operations.

To implement LNA swapping with the transceiver embodiment depicted, therefore, an LNA swap bit (LNASWAP) in a selected register can be used. To move to the swap mode, the LNA swap bit is set to one (where a swap bit has been selected to be a zero in a default non-swap mode). It is also noted that additional configuration registers and/or additional control bits could be provided, if desired, so that the operational band for each LNA could be individually selected or additional operational bands could be utilized. For example, a four-bit register could be utilized such that each of the RFIA, RFIE, RFID and RFIP LNAs 110A, 110B, 110C and 110D, respectively, can be individually alternated between bands. In this further embodiment, therefore, the RFIA inputs and GSM 850 LNA 110A could be individually selectable between GSM 850 band and E-GSM 900 band operations. The RFIE inputs and E-GSM 900 LNA 110B could be individually selectable between E-GSM 900 band and GSM 850 band operations. The RFID inputs and DCS 1800 LNA 110C could be individually selectable between DCS 1800 band or PCS 1900 band operations. And the RFIP inputs and PCS 1900 LNA 110D could be individually selectable between PSC 1900 band or DCS 1800 band operations. It is further noted that other configuration options and associated configuration registers could also be provided, as desired.

Looking back to FIG. 3A, a block diagram is depicted for an embodiment 300 of the present invention for a dual-band implementation directed to 850 MHz and 1900 MHz bands where a swap control register (LNASWAP) is set to its default setting. As depicted, two input signals 210A and 210D are received by the filter and matching circuitry 118. Input signal 210A provides the 850 MHz band signal, and input signal 210D provides the 1900 MHz band signal. Input signal 210A is connected to SAW filter 104A, matching network 106A, and LNA 110A. Input signal 210D is connected to SAW filter 104D, matching network 106D, and LNA 110D. It is noted that the matching networks 106A and 106D are shown as a circuit with two capacitors and an inductor. Other matching networks could also be used, as desired.

The purpose of the matching network is to transform the input impedance of the LNA circuit elements on the receiver/transceiver IC 108, as well as other package/PCB parasitics, to a value that is desired for the output impedance of the SAW, within the band of interest, so as to improve performance parameters, such as noise figure, gain, and reflection coefficient parameters across the band. The impedance transformation is narrowband in nature, and is thus band-specific. The impedance transformation is also dependent on the PCB/pin-position/package of the RF trace on the PCB. For instance, the matching network (MN) elements corresponding to the DCS frequency band on a DCS-default LNA will be different from the DCS frequency band on the PCS-default LNA (which is the swapped configuration).

The outputs of the LNAs are provided to receive path circuitry 112, which in turn outputs signals which could be complex, differential output signals (I/Q) 120 to a baseband processor. The receive path circuitry 112, as depicted, includes a voltage control oscillator (VCO) and frequency synthesizer that provides local oscillator (LO) signals to a quadrature generator which in turn provides mixing signals to mixing circuitry. The output of the mixing circuitry is provided to real receive path (I) processing circuitry (RX Chain) that outputs real path (I) signals as part of the output signals 120. The output of the mixing circuitry is also provided to imaginary receive path (Q) processing circuitry (RX Chain) that outputs imaginary path (Q) signals as part of the output signals 120. It is also noted that the differential I and Q output signals from receiver IC 108 can be analog output signals generated from an analog interface block that receives digital I and Q signals from the real and imaginary receive path processing circuitry. The receiver/transceiver output to the external baseband chip may also be a serial digital stream or other signal format. Additionally, the signal format could take different forms if the receiver/transceiver were integrated into a module or integrated together on the same die.

The receiver 108 is designed to operate in four bands of operation. LNA 110A is primarily designed for the 850 MHz GSM band (RFIA). The LNA 110B is primarily designed for the 900 MHz E-GSM band (RFIE). LNA 110C is primarily designed for the 1800 MHz DCS band (RFID). And the LNA 110D is primarily designed for the 1900 MHz PCS band (RFIP). In addition, according to the present invention, the LNAs are band swappable such that they can operate in more than one band. For example, LNA 110A can be swapped to operate in the 900 MHz E-GSM band (RFIE), and LNA 110B can be swapped to operate in the 850 MHz GSM band (RFIA). Thus, LNAs 110A and 110B are swappable between the low frequency bands. Similarly, LNA 110C can be swapped to operate in the 1800 MHz DCS band (RFID), and LNA 110D can be swapped to operate in the 1900 MHz PCS band (RFIP). Thus, LNAs 110C and 110D are swappable between the high frequency bands.

It is noted that the LNAG signal represents the signals provided to the LNAs to select or determine their respective operational bands. For example, as discussed below with respect to FIG. 4, this signal can change operational parameters for the LNA such as the bias voltages applied to transistor circuits within the LNA circuitry such that only the active LNA is powered-up and operational. The LNAG signals are based upon the setting of the LNASWAP bit. (It is noted that the LNAG signals could also be based upon additional register bit settings or control setting, if desired, that help determine or select respective operational bands, such as settings related to geographic regions and desired channels to be tuned). It is further noted that the LNASWAP bit represents a bit in an on-chip configuration register that can be set to select default mode or swap mode and thereby select the frequency bands of operation. In embodiment 300, the LNASWAP bit has been set to "0" which is its default setting (LNASWAP=0). As such, LNA 110A is operating in its primary 850 MHz GSM band (RFIA), and LNA 110D is operating in its primary 1900 MHz PCS band (RFIP). It is noted that this default setting may be the setting to which the LNASWAP bit is automatically set on power-up of the receiver IC 108. It is further noted that depending upon the design utilized for the LNAs, the LNAG signals could cause no changes in the LNA operational parameters such that the LNA circuitry is configured the same for both default and non-default frequency bands.

FIG. 3B is a block diagram for an embodiment 350 that represents the embodiment of FIG. 3A where the swap register is set to a non-default swap-mode setting such that the dual-band implementation is now directed to the 900 MHz and 1800 MHz bands. In embodiment 350, the LNASWAP bit has now been set to "1" which is its non-default setting (LNASWAP=1). As such, LNA 110A is operating in its non-default 900 MHz E-GSM band, and LNA 110D is operating in its non-default 1800 MHz DCS band.

Because the LNAs are interchangeable according to the present invention, the PCB traces to the pins of receiver IC 108 are not required to be changed, as would be the case with prior solutions. Only the external components used with the filter and matching circuitry 118 are changed, if desired, to reflect the new operational bands. The input signals 210B and 210C received by the filter and matching circuitry 118 are now the 900 MHz E-GSM band and the 1800 MHz DCS band, respectively. The input signal 210B is processed through the SAW filter 104B and the matching network 106B before being provided to the inputs of LNA 110A. The input signal 210C is processed through the SAW filter 104C and the matching network 106C before being provided to the inputs of LNA 110D. It is noted that the matching networks 106B and 106C are shown as a circuit with two capacitors and an inductor. Other matching networks could also be used, as desired.

The following table provides a summary of example LNASWAP configuration settings and associated frequency bands of operation for the LNAs depicted in FIGS. 3A and 3B. As depicted in this embodiment, if the cellular network indicates 850 MHz GSM communications, the communication device will use LNA 110A for the receive input if the LNASWAP bit is "0" and will use LNA 110B if the LNASWAP bit is "1." If the cellular network indicates 900 MHz E-GSM communications, the communication device will use LNA 110B for the receive input if the LNASWAP bit is "0" and will use LNA 110A if the LNASWAP bit is "1." If the cellular network indicates 1800 MHz DCS communications, the communication device will use LNA 110C for the receive input if the LNASWAP bit is "0" and will use LNA 110D if the LNASWAP bit is "1." If the cellular network indicates 1900 MHz PCS communications, the communication device will use LNA 110D for the receive input if the LNASWAP bit is "0" and will use LNA 110C if the LNASWAP bit is "1." As discussed above, it is noted that the LNASWAP bit can be controlled by the baseband processor 114 during operation of the communication system. For example, the LNASWAP bit can be set by the baseband processor 114 to its default setting for certain bands of operation and then can be set by the baseband processor 114 to its non-default setting for other bands of operation. The configuration register band swapping control of the present invention, therefore, provides a simple and efficient mechanism for determining the frequency bands of operation thereby providing significant flexibility and efficiency advantages for communication system manufacturers in their design of PCBs and communication products.

TABLE 1

EXAMPLE LNASWAP BIT CONFIGURATION SETTINGS

| LNA | SWAPPABLE BANDS (DEFAULT/NON-DEFAULT) | LNASWAP BIT | INPUT PINS UTILIZED | BAND OF OPERATION |
|---|---|---|---|---|
| 110A | 850 MHz GSM/ 900 MHz E-GSM | 0 | RFIA | 850 MHz GSM |
| 110B | 900 MHz E-GSM/ 850 MHz GSM | 0 | RFIE | 900 MHz E-GSM |
| 110C | 1800 MHz DCS/ 1900 MHz PCS | 0 | RFID | 1800 MHz DCS |
| 110D | 1900 MHz PCS/ 1800 MHz DCS | 0 | RFIP | 1900 MHz PCS |
| 110A | 850 MHz GSM/ 900 MHz E-GSM | 1 | RFIA | 900 MHz E-GSM |
| 110B | 900 MHz E-GSM/ 850 MHz GSM | 1 | RFIE | 850 MHz GSM |
| 110C | 1800 MHz DCS/ 1900 MHz E-PCS | 1 | RFID | 1900 MHz PCS |
| 110D | 1900 MHz PCS/ 1800 MHz E-DCS | 1 | RFIP | 1800 MHz DCS |

FIG. 4 is a circuit diagram for an embodiment of a low noise amplifier (LNA) 400 that can be used to implement LNAs 110A, 110B, 110C and/or 110D. In this embodiment, differential signals 210 from the matching network are provided to differential amplifier inputs provided by the gates of NMOS transistors M1 and M3. The drains of transistors M1 and M3 are connected through the source/drain of NMOS transistors M2 and M4 to resistors R1 and R2. Resistors R1 and R2 are then connected to supply voltage $V_{DD}$. The drains of transistors M2 and M4 provide differential output signals 410 that are provided to other receive path circuitry. The source of transistor M1 is connected through inductor L1 to the drain NMOS transistor M5. Similarly, the source of transistor M3 is connected through inductor L2 to the drain of transistor M5. The source of transistor M5 is connected to ground (GND). Signals 401, 402, 403, 404 and 405 represent bias voltage signals for the gates of transistors M1, M2, M3, M4 and M5. It is noted that the off-chip matching network (MN) elements and the on-chip LNA circuit elements together implement a narrowband gain amplifier. Although this inductor source degenerated topology is a narrowband system, the bandwidth typically is made wide enough to receive the widest band of the communication system (such as the DCS band in the GSM/GPRS/EDGE system) without much attenuation at the edge of the band.

It is noted that passive multiplexing of multiple LNA circuits 400 can be accomplished by coupling together the output nodes 406 and 408 of multiple LNA circuits 400. As such, for example, two LNA circuits 400 could be configured to share the load resistors (R1, R2). The rest of the circuitry would be duplicated for each LNA circuit 400. For the non-selected LNA, the transistors M2 and M4 could then be utilized for circuit isolation, and the transistor M5 that normally provides the bias current can be turned off to further help isolate and save power. Thus, the non-selected LNA circuit can be powered down and isolated through control of the bias voltage signals 401, 402, 403, 404 and 405 that are provided to transistors M1, M2, M3, M4 and M5, respectively. For example, the gate of transistor M5 can be pulled to ground. In addition, if desired, the bias voltages for transistors M2 and M4, as well as DC bias voltages for transistors M1 and M3, can be controlled so as to manage high voltage stress while the LNA is not being used. Other configurations could also be utilized, if desired, to provide for selection of which LNA circuit outputs are processed by the receive path circuitry within an receiver/transceiver integrated circuit.

It is also noted that the LNA embodiment 400 depicted represents merely one example for LNA circuitry, and other LNA architectures could also be utilized if desired. It is further noted that the multi-band operational characteristics for LNA 400 can be modified by modifying the characteristics and values for the circuit devices used in implementing the LNA circuitry, including the circuit characteristics for transistors M1 and M3 and the circuit characteristics for inductors L1 and L2.

For example, by increasing the width of M1/M3 (and scaling up the current to maintain linearity), the Q of the front-end network (matching network elements, gate-to-source capacitance (Cgs) of M1/M3, and source-degeneration inductance (Ls)) can be lowered. Lowering the Q of the front-end LNA circuitry can improve its performance when the LNA is swapped into operation in its non-default band, because the system is now more wideband. The lowered Q may lower the LNA front-end gain, but the increased transconductance (Gm) of the M1/M3 differential pair tends to maintain the overall LNA gain more or less constant. The lowered Q also tends to make the LNA circuitry more tolerant to component variations and thus improves the reflection coefficient (S11) of the LNA across the band. In addition, the lowered Q improves the LNA noise figure (NF) by reducing the noise contribution of the lossy matching network (MN) elements. As the embodiment 400 of FIG. 4 illustrates, a resistive load (R1, R2) is used, as opposed to a narrow-band LC load. Although a resistive load may require more supply headroom and perhaps have bandwidth (BW) lowpass filter restrictions, it offers the flexibility of reconfiguring the on-chip LNA circuitry to be used in a different band by simply altering the component values of the external matching network (MN) elements. Of course, the overall LNA performance may be the most optimal for a different band, if the on-chip LNA circuit elements and the off-chip MN elements are both tuned for that particular band. However, fixing the on-chip LNA circuitry provides efficiency advantages with respect to the receiver/transceiver integrated circuit. It is further noted that in designing LNA circuitry for a dual-band application, it is desirable to design the on-chip device parameters (in this case, to achieve a lowered Q) so that the difference between the performance for the primary band of operation for the LNA circuitry and the performance for the secondary swapped band of operation for LNA circuitry is less than or equal to 1.0 dB. Preferably, a performance difference between the swappable bands of less than or equal to 0.5 dB is desirable, and even more preferably a performance difference between the swappable bands of less than or equal to 0.25 dB is desirable. In this swapping of the bands, the on-chip LNA circuitry is kept the same, and only the external matching network (MN) elements are changed.

Thus, by lowering the Q of the LNA circuitry, more current consumption may be needed (e.g., to maintain linearity), but the LNA performance (such as noise figure (NF), reflection coefficient (S11), etc.) is enhanced in the default frequency band of operation, as well as when the LNA is swapped into operation in its non-default band. This lower Q, therefore, tends to make the LNA circuitry more tolerant to band variations and tends to improve noise performance with respect to swapped bands. In addition, by using a resistive load instead of an LC load, the LNA circuitry is made less band specific. In effect, the LNA circuitry can be designed for reasonably good operation in multiple bands that are reasonably close together by lowering the Q of circuit as opposed to the traditional approach of optimizing operation for a single band. As indicated above, this band swappable operation can be accomplished, for example, by designing LNA circuitry such that it is tuned in a more wideband fashion for multi-band operation rather than tuning the LNA circuitry to a more narrowband input frequency that corresponds to a single, specific frequency band. It is to be further noted that the Q can only be lowered to a certain extent, before other factors, such as limited supply headroom at the load and increased capacitive parasitics at the terminals of M1/M3 and M2/M4, start to degrade the LNA functional performance. The headroom can limit the largest signal that can be processed (or degrade linearity at the cascode M2/M4 transistor). The increased capacitive parasitics can limit the highest frequency band in which the LNA can operate.

It is noted that in one embodiment, the LNASWAP control signal selects which receive path LNA circuit will be used and causes that selected LNA circuitry to be powered up. The other LNA circuits can then be powered down through the same control. In another embodiment, the LNASWAP control signal can also control and change the values of certain on-chip LNA circuit elements such as a source-degeneration inductor or other capacitive elements that can be part of the front-end resonant circuit for the on-chip LNA circuitry. This additional design flexibility can enable swapping bands that are separated further apart in frequencies or yield higher performance. In yet another embodiment, a wideband LNA topology may be chosen that may be more suitable in some multi-band, multi-system swap applications. In short, a wide variety of LNA architectures could be implemented depending upon the characteristics of the frequency bands of interest and the nature of the signals to be tuned for these frequency bands.

FIGS. 5A and 5B provide example embodiments 500 and 550, respectively, for use of the present invention with PCBs and modularized packages 504A and 504B. For these embodiments, it is assumed that a manufacturer desires to implement a triple-band communication device. It is also assumed that the transceiver 108 represents integrated transceiver circuitry having four different input paths with each input path being designed for default operation in a particular band. As depicted, it is assumed, for example, that from top to bottom, the LNAs are designed for default operation in band 1 (B1), band 2 (B2), band 3 (B3), and band 4 (B4), respectively. In addition, from top to bottom, the are designed for non-default operation in band 2 (B2), band 1 (B1), band 4 (B4), and band 3 (B3), respectively. Thus, the input paths for the integrated circuit 108 are designed such that two paths are swappable between bands 1 and 2 (B1/B2) and two paths are swappable between bands 3 and 4 (B3/B4).

For embodiment 500 in FIG. 5A, the manufacturer desires to use a modularized FEM 502A or filterbank 504A with three bands, namely, band 1 (B1), band 2 (B2) and band 3 (B3). On the PCB being designed by the manufacturer, these bands are oriented as shown bands 1, 2, and 3 (orientated as shown from top to bottom) from a quad-band capable integrated transceiver 108. At the PCB level, therefore, the manufacturer could fabricate a PCB with component footprints and signal traces that corresponds to physical arrangement depicted in FIG. 5A. An antenna connects to an antenna switch module (ASM) or duplexer, and the ASM (or duplexer) connects to the filterbank, for example, including a band 1 SAW filter (B1), a band 2 SAW filter (B2) and a band 3 SAW filter (B3). As discussed above, the ASM and filterbank can be modularized into a single package to form FEM 502A, or the filterbank can be modularized into a single package 504A. The filterbank is then coupled to matching network circuits 506A. The matching networks are in turn connected to respective input pins and LNA circuits within the integrated transceiver 108 as shown in FIG. 5A. As described above, the receive path for the transceiver can also include mixer circuitry and digital signal processing circuitry (RX Chain), as shown. Finally, the transceiver 108 can output signals to a baseband processor 114, which may be a separate integrated circuit, if desired. It is also noted that the baseband processor 114 and the transceiver 108 could be integrated within the same integrated circuit, if desired.

If the manufacturer then desires to implement a communication device operable in a different set of bands, the present invention allows for the same PCB routing to be utilized. For example, consider the circumstance where the manufacturer now desires to use band 2 (B2), band 1 (B1), and band 4 (B4) orientated as shown from top to bottom in FIG. 5B. As such, the manufacturer can now use a triple-band modularized FEM package 502B or a modularized filterbank package 504B with a new set of filters while still maintaining the same PCB footprint and signal routing. At the PCB level, therefore, the manufacturer would exchange FEM 502B for FEM 502A or exchange filterbank 504B for filterbank 504A. The filters now include, for example, a band 2 SAW filter (B2), a band 1 SAW filter (B1) and a band 4 SAW filter (B4). In addition to these filter changes, appropriate matching networks 506B would be provided for the new frequency bands of operation. According to the present invention, the input signal paths to the transceiver integrated circuit 108 would not need to be altered. Rather, appropriate control signals could be applied to the integrated circuit 108 to instruct it to enter a swap mode. The only modifications needed are to the external filterbank 504B and the matching network 506B in order to provide operation in the swapped frequency bands. In this way, it is sufficient only to modify the external circuitry for tuning the system to new bands of operation thereby increasing the efficiency of the system design and reducing the need for additional PCBs.

As described above, in this swap mode, the transceiver 108 is receiving a non-default frequency band at the input paths. For example, the top input path and associated LNA has a default band of band 1 (B1) but is receiving band 2 (B2). The second input path and associated LNA has a default band of band 2 (B2) but is receiving band 1 (B1). And the third input path and associated LNA has a default band of band 3 (B3) but is receiving band 4 (B4). The fourth input path and associated LNA is not be used, has a default band of band 4 (B4) and a non-default band of band 3 (B3).

It is also noted that the bands could be ordered in embodiment 550 such that the top two bands are not swapped but the third band is swapped. As such, the top input path and associated LNA would receive its default band 1 (B1). The second input path and associated LNA would receive its default band 2 (B2). And the third input path and associated LNA would receive its non-default band 4 (B4). In operation, the baseband processor 114 is configured to set the LNA swap bit to its default setting (e.g., LNASWAP=0) when the first band (B1) or the second band (B2) is being received by the communication system 550. The baseband processor 114 is also configured to set the LNA swap bit to its non-default setting (e.g., LNASWAP=1) when the fourth band (B4) is being received by the communication system 550. Thus, the LNA swap bit is controlled during operation based upon the frequency bands being received and the band configuration that has been selected for the communication system and its PCB design.

By providing the ability to swap input paths such that default and non-default frequency bands can be received and processed using the same input path, the present invention allows for increased flexibility and efficiency in the design of communication system devices and related PCBs. As indicated above, rather than supporting swappable input signals between two frequency, the LNAs could be designed to support any desired number of frequency bands with the integrated circuit being configured to have appropriate control signals and register settings to select among these selectable frequency bands of operation for the respective receive path inputs to the integrated circuit.

It is noted that without the present invention, in moving from embodiment 500 in FIG. 5A to embodiment 550 in FIG. 5B, a manufacturer would be forced to make another PCB for the new band configuration, to cross the PCB traces from the FEM or filterbank outputs to the band specific receiver/transceiver inputs, or to use band-variant transceiver ICs with band specific input stages rotated to match the new band configuration.

Another obvious scenario where the present invention is particularly advantageous is where a manufacturer desires to have multiple sources for the same integrated front-end component to ensure adequate supply and competition. In this case, different FEM or filterbank vendors would all have capability for the same frequency bands but the pin-outs could be in a different order on the FEM or filterbank package. Without the present invention, these different modularized packages from the different vendors would again force manufacturers to construct another PCB and cross the PCB traces, stock and manage different modularized packages with the band specific content rotated, use transceiver IC variants with the band specific input stages rotated, or simply be unable to consider the alternate modularized package(s). As such, the manufacturer may be effectively limited to considering a single source for front-end components. The frequency band specific nature of prior solutions, therefore, required inefficient financial and labor resource allocation from the communication product manufacturers when implementing the different permutation subsets of the available frequency bands and/or communication systems. Alternatively, additional unique receiver/transceiver IC product variants from the transceiver vendors were required.

It is noted that the embodiments 500 and 550 in FIGS. 5A and 5B also include transmit paths. For example, the baseband processor 114 outputs signals to the transmit path (TX Chain). These signals can then be converted and processed by the transmit path before being buffered by output circuits 514 and 516, pass through matching networks 510 and 512, and output to the power amplifier (PA) 508. The PA 508 then amplifies the signals for transmission through the ASM (or duplexer) to the antenna (ANT). It is noted that the signals between the transceiver 108 and the baseband processor 114 are real path (I) and imaginary path (Q) signals. It is further noted that the signals between the matching networks and the transceiver 108 are shown as differential signals. Other signal configurations could be utilized, if desired, such as single ended signaling or digital communications between system blocks.

It is noted that the receive path circuitry described above is equally applicable to other integrated circuit environments and communication interface protocols. For example, the swappable LNA circuitry described above could be part of a broader system solution where receiver/transceiver and baseband processing is integrated into the same integrated circuit. In addition, the signals output by the receiver/transceiver integrated circuit can be analog output signals or digital output signals, as desired. If digital output signals are utilized, the signals can be provided as part of a digital interface protocol, such as, for example, the DigRF protocol. In short, a wide range of communication system devices and integrated circuit configurations could utilize the multi-band, swappable receive path circuitry of the present invention.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A communication system having band swappable receive inputs, comprising:
   receive path circuitry within an integrated circuit chip having:
      one or more low noise amplifiers (LNAs) each having an input pin and each being configured to operate in multiple frequency bands with a performance degradation of lower than 1.0 dB between frequency bands and each configured to receive multiple frequency bands on a respective LNA input pin; and
   control circuitry to provide one or more control signals to select a single frequency band of operation for respective LNAs; and
   external circuitry coupled to the respective LNAs, the external circuitry having a filter stage and an input match stage configured for the multiple frequency bands for each respective LNA; and
   a printed circuit board (PCB) that couples the integrated circuit to the external circuitry via fixed connections, each of the fixed connections connecting the external circuitry to one of the input pins of the LNAs.

2. The communication system of claim 1, wherein the frequency bands comprise cellular telephone frequency bands.

3. The communication system of claim 1, wherein the frequency bands comprise at least one cellular telephone frequency band and at least one other frequency band from another type of communication system.

4. The communication system of claim 1, wherein the frequency bands comprise a 850 MHz (GSM) band, a 900 MHz (E-GSM) band, a 1800 (DCS) band, or a 1900 MHz (PCS) band.

5. The communication system of claim 4, wherein the receive path circuitry comprises four LNAs with each LNA configured to be swappable between at least two frequency bands.

6. The communication system of claim 5, wherein two LNAs are swappable between the 850 MHz (GSM) and the 900 MHz (E-GSM) bands and two LNAs are swappable between the 1800 MHz (DCS) and 1900 MHz (PCS) bands.

7. The communication system of claim 6, wherein the integrated circuit comprises two input pins associated with each LNA.

8. The communication system of claim 6, wherein the communication system is configured for operation in a dual-band or a triple-band cellular telephone handset such that one or two of the input pin pairs are not used to receive frequency band input signals.

9. The communication system of claim 1, wherein the external circuitry comprises a SAW filter and a matching network for each frequency band of operation within the fixed set of frequency bands.

10. The communication system of claim 1, wherein the control circuitry comprises a software programmable configuration register including one or more bits configured to allow selection of frequency bands of operation far the LNAs.

11. The communication system of claim 10, wherein the programmable register comprises a single swap bit that selects a first set of frequency bands in a default setting and a second set of frequency bands in a non-default setting.

12. The communication circuit system of claim 11, wherein the frequency bands comprise cellular telephone frequency bands and wherein the receive path circuitry comprises a first LNA having a default mode of operation in a 850 MHz (GSM) band and a non-default mode of operation in a 900 MHz (E-GSM) band, a second ENA having a default mode of operation in the 900 MHz (E-GSM) band and a non-default mode of operation in the 850 MHz (GSM) band, a third LNA having a default mode of operation in a 1800 MHz (DCS) band and a non-default mode of operation in a 1900 MHz (PCS) band, and a fourth LNA having a default mode of operation in the 1900 MHz (PCS) band and a non-default mode of operation in the 1800 MHz (DCS) band.

13. The communication system of claim 1, wherein the receive path circuitry comprises at least two LNAs.

14. The communication system of claim 13, wherein at least one LNA is swappable between an 850 MHz band and a 900 MHz band and at least one LNA is swappable between a 1800 MHz band and a 1900 MHz band.

15. The communication system of claim 1, wherein the fixed set of frequency bands of operation include at least one WCDMA band.

16. The communication system of claim 1, wherein a performance difference for the LNAs between the swappable bands is less than equal to 0.5 dB.

17. The commnunication system of claim 1, wherein a performance difference for the LNAs between the swappable bands is less than equal to 0.25 dB.

18. The communication system of claim 1, wherein the fixed set of frequency bands of operation are fewer in number than the LNAs such that one or marc LNAs are unused.

19. A method for receiving communications with band swappable receive inputs in a communication system having fixed frequency bands of operation for receive inputs, comprising:
  providing an integrated circuit with receive path circuitry having one or more low noise amplifiers (LNAs), each LNA having an input pin and configured to operate in multiple frequency bands with a performance degradation of lower than 1.0 dB between frequency bands, each LNA configured to receive signals in the multiple frequency bands on a respective input pin;
  determining a fixed set of frequency bands of operation for the communication systems;
  configuring external circuitry for operation in the fixed set of frequency bands, the external circuitry comprising a filter stage and input match stage for each frequency band of operation;
  coupling the integrated circuit and the external circuitry to a printed circuit board (PCB), the PCB having fixed connection paths, each connection path connecting the external circuitry to one of the input pins of a respective LNA;
  selecting through software programming the frequency bands of operation associated with the LNAs to match the fixed set of frequency bands of operation determined for the communication system such that a particular frequency band is always received through the same LNA during operation of the communication systems; and
  receiving one or more input signals within the fixed frequency bands for the LNAs at input pins to the integrated circuit.

20. The method of claim 19, wherein the frequency bands comprise cellular telephone frequency bands.

21. The method of claim 19, wherein the frequency bands comprise at least one cellular telephone frequency band and at least one other frequency band from another type of communication system.

22. The method of claim 19, wherein the frequency bands include a 850 MHz (GSM) band, a 900 MHz (E-GSM) band, a 1800 MHz (DCS) band, or a 1900 MHz (PCS) band.

23. The method of claim 19,further comprising providing two or more LNAs, and leaving unconnected any unused input pins associated with any unused LNAs where the fixed set of frequency bands of operation are fewer in number than the LNAs.

24. The method of claim 19,further comprising coupling to the PCB a SAW filter and a matching network as the external circuitry for each frequency band of operation.

25. The method of claim 19, wherein the providing step comprises providing four or more LNAs with each LNA configured to be swappable between at least two frequency bands.

26. The method of claim 19, wherein the selecting step comprises programming one or more bits of a configuration register within the integrated circuit to select frequency bands of operation for the LNAs.

27. The method of claim 26, wherein the selecting step comprises selecting a first set of frequency bands in a default setting and a second set of frequency bands in a non-default setting.

28. The method of claim 27, wherein the frequency bands comprise cellular telephone frequency bands and wherein selecting the default setting selects a 850 MHz (GSM) band for a first LNA, selects a 900 MHz (E-GSM) band for a second LNA, a 1800 MHz (DCS) band for a third LNA, and a 1900 MHz (PCS) band for a fourth LNA; and selecting the non-default settings selects the 900 MHz (E-GSM) band for the first LNA, selects the 850 MHz (GSM) band for the second LNA, selects the 1900 MHz (PCS) band for the third LNA, and selects the 1800 MHz (DCS) band for the fourth LNA.

29. The method of claim 19, wherein two or more LNAs are provided and the selecting step comprises selecting a default frequency band of operation for at least one of the LNAs and selecting a non-default frequency band of operation for at least one of the LNAs.

30. The method of claim 29, wherein the selecting step further comprises receiving command signals from a baseband processor to select the frequency bands of operation.

31. The method of claim 30, wherein the receive path circuitry and the baseband processor are integrated within the same integrated circuit.

32. The method of claim 19, further comprising providing at least two LNAs.

33. The method of claim 32, further comprises configuring a least one LNA to be swappable between an 850 MHz band and a 900 MHz band and configuring at least one LNA to be swappable between a 1800 MHz band and a 1900 MHz band.

34. The method of claim 19, wherein the fixed set of frequency bands of operation include at least one WCDMA band.

35. The method of claim 19, further comprises configuring the LNAs so that a performance difference for the LNAs between the swappable bands is less than equal to 0.5 dB.

36. The method of claim 19, further comprising configuring the LNAs so that a performance difference for the LNAs between the swappable bands is less than equal to 0.25 dB.

37. The method of claim 19, wherein the providing and determining step are performed such that the fixed set of frequency bands of operation are fewer in number than the LNAs and one or more LNAs are unused.

* * * * *